United States Patent
Araie et al.

(10) Patent No.: US 8,276,489 B2
(45) Date of Patent: Oct. 2, 2012

(54) SPINDLE APPARATUS

(75) Inventors: Ichiro Araie, Sakai (JP); Shuichi Kawada, Sakai (JP); Taro Hasegawa, Sakai (JP)

(73) Assignee: Sodick Co., Ltd., Kanagawa (JP)

( * ) Notice: Subject to any disclaimer, the term of this patent is extended or adjusted under 35 U.S.C. 154(b) by 1041 days.

(21) Appl. No.: 11/993,000

(22) PCT Filed: Feb. 27, 2007

(86) PCT No.: PCT/JP2007/054145
§ 371 (c)(1),
(2), (4) Date: Apr. 2, 2008

(87) PCT Pub. No.: WO2007/097476
PCT Pub. Date: Aug. 30, 2007

(65) Prior Publication Data
US 2009/0133546 A1    May 28, 2009

(30) Foreign Application Priority Data
Feb. 27, 2006   (JP) .................................. 2006-050452

(51) Int. Cl.
*B23H 7/26* (2006.01)
(52) U.S. Cl. ............................... 82/147; 82/168; 82/142
(58) Field of Classification Search .................. 82/146, 82/142, 147, 168; 219/69.2; *B23H 7/26, B23H 7/30*
See application file for complete search history.

(56) References Cited

U.S. PATENT DOCUMENTS

| | | | | |
|---|---|---|---|---|
| 3,822,514 A | * | 7/1974 | Vetter | 451/343 |
| 3,970,882 A | * | 7/1976 | Dupuis et al. | 310/245 |
| 3,988,049 A | * | 10/1976 | Williams et al. | 439/23 |
| 5,353,642 A | * | 10/1994 | Hasegawa et al. | 73/535 |
| 7,824,526 B2 | * | 11/2010 | Yuan et al. | 204/224 M |

FOREIGN PATENT DOCUMENTS

| | | | |
|---|---|---|---|
| EP | 1 867 431 | | 12/2007 |
| JP | 60-131124 | | 7/1985 |
| JP | 62162431 A | * | 7/1987 |
| JP | 6-210501 | | 8/1994 |
| JP | 6-210554 | | 8/1994 |
| JP | 06210554 A | * | 8/1994 |
| JP | 2000126938 A | * | 5/2000 |
| JP | 2000158277 A | * | 6/2000 |
| JP | 2007007810 A | * | 1/2007 |
| JP | 2007061995 A | * | 3/2007 |
| JP | 2010207971 A | * | 9/2010 |

* cited by examiner

*Primary Examiner* — Boyer D Ashley
*Assistant Examiner* — Sara Addisu
(74) *Attorney, Agent, or Firm* — McDermott Will & Emery LLP

(57) ABSTRACT

A spindle apparatus includes a rotatable first spindle (5, 32) to which a tool can be attached. The first spindle is supported in a base with high precision using an air hydrostatic bearing. The spindle apparatus further includes a second spindle (6, 33) capable of rotation about an axis substantially aligned with the axis of the first spindle, first connection means for electrically connecting a base side and the second spindle, and second connection means for electrically connecting the first spindle and the second spindle. Electrical connection between the base side and the first spindle is carried out via the first and second connection means. The first connection means is, for example, a brush (15, 36). The second connection means has a degree of mechanical freedom and is, for example, a flexible electrical wire (17, 39) or a helical spring (51).

8 Claims, 5 Drawing Sheets

SPINDLE APPARATUS

FIELD OF THE INVENTION

The present invention relates to a spindle apparatus used in a machine tool such as an electric discharge machine or a machining center.

BACKGROUND ART

A spindle apparatus includes a base, such as a housing, and a spindle supported so as to be capable of rotation with respect to the base. A tool is fitted to the spindle, either directly or via a tool holder. A spindle apparatus having electrical contact between the base and the spindle in order to supply electrical current from the base side to the spindle and lead sensor signals from the spindle to the base side is known. Sensor signals may be signals indicating contact between a tool and a workpiece. Japanese patent No. 3238218 and Japanese examined patent application No. 3-058851 disclose a spindle apparatus in which electrical current for electric discharge machining is supplied to a tool via the spindle. In Japanese patent No. 3238218, a conducting ring is provided on the spindle, and a brush is pressed against the conducting ring in a radial direction. In patent application No. 3-058851, a brush is pressed against the spindle in a radial direction. It is often the case that the brush is brought into contact with the spindle in this way in order to supply electrical current from the base side to the rotating spindle.

In recent years, there has been advancement in the improvement of spindle bearings, etc. in response to calls for improved machining precision, etc. of machine tools. As a result, spindle apparatus have been proposed that are capable of rotating a spindle about its axis with remarkably high precision. With a spindle apparatus in which a brush is pressed against the spindle, rotating the spindle about its axis with high precision is difficult. In order to reliably connect the base and the spindle, it is necessary to increase the pressing force of the brush on the spindle. However, a higher pressing force increases axial vibration of the spindle. On the other hand, a weak pressing force causes insufficient contact of the brush with the spindle, and as a result electrical contact between the base side and the spindle becomes unstable.

SUMMARY OF THE INVENTION

The present invention has been conceived in view of the above-described situation. An object of the present invention is to provide a spindle apparatus that is capable of suppressing axial vibration of a spindle and causing rotation of the spindle about its axis with high precision, while establishing a reliable electrical connection between a base side and the spindle.

A spindle apparatus of the present invention includes a first spindle (5, 32) configured to rotate with respect to a base, a second spindle (6, 33) configured to rotate about an axis substantially aligned with the axis of the first spindle, first connection means for electrically connecting a base side and the second spindle, and second connection means having a degree of mechanical freedom for connecting the first spindle and the second spindle. Electrical connection between the base side and the first spindle is carried out by means of the first and second connection means.

The first connection means preferably makes electrical connection between the base side and the second spindle reliable, and is, for example, a brush (15, 36) pressed against the second spindle.

The second connection means is, for example, a flexible electrical wire (17, 39) or a helical spring (51). Even if axial vibration arises in the second spindle due to the first connection means, the second connection means has a degree of mechanical freedom, which means that there is the effect of a force that would cause axial vibration in the first spindle substantially not being transmitted to the first spindle from the second spindle. This type of effect is important in a spindle apparatus for supporting a first spindle with high precision using an air hydrostatic bearing.

The second spindle preferably is rotated in synchronism with the first spindle. As a result, electrical connection between the first spindle and the second spindle is carried out in a stable fashion.

DESCRIPTION OF THE PREFERRED EMBODIMENTS

A first embodiment of a spindle apparatus will now be described with reference to FIG. 1 and FIG. 2.

Figure 1:
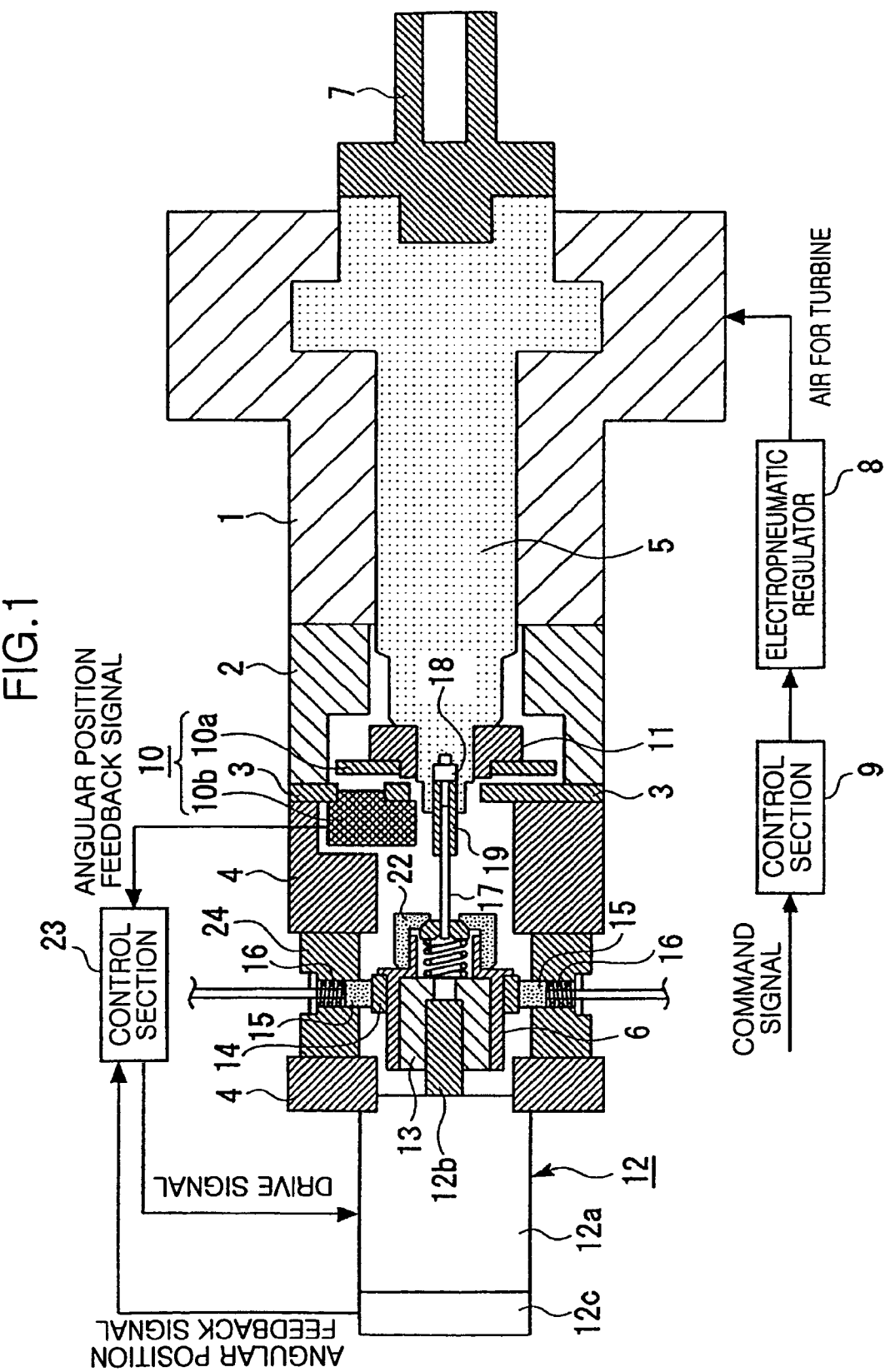
FIG. 1 is a cross-sectional drawing showing a first embodiment of a spindle apparatus of the present invention.

As shown in FIG. 1, the spindle apparatus of the present invention is provided with a bearing housing 1, a cylindrical connecting member 2, a disc-shaped detection head attachment plate 3, and a cylindrical motor retention member 4. These components integrally form a base. The spindle apparatus of FIG. 1 is also provided with first and second spindles 5, 6 made of a conductive material. The first spindle 5 is supported by an air hydrostatic bearing (not illustrated) built into the bearing housing 1, enabling rotation of the spindle with extremely high accuracy about an axis extending in the lateral direction in FIG. 1. A desired tool can be attached to the tip end of the first spindle 5 using a tool holder 7. The desired tool is, for example, an electrode used for electric discharge machining. A turbine blade (not shown) is provided on the first spindle 5, which is a turbine rotor that is rotated by injecting air into the turbine blade. Air is supplied from an electropneumatic regulator 8 through a suitable supply path to the first spindle 5. A control section 9 sends control signals (electrical signals) to the electropneumatic regulator 8 so that the first spindle 5 can rotate at a rotational speed indicated by a command signal. A rotary encoder 10 consisting of a rotation plate 10a and a detection head 10b is provided in order to detect the angular position of the first spindle 5. The rotation plate 10a is fixed to a rear end of the first spindle 5 using an attachment member 11. The detection head 10b is fixed to the detection head attachment plate 3 so as to face the rotation plate 10a.

The cylindrical second spindle 6 is supported within the base and is capable of rotation about an axis that is in alignment with an axis of the first spindle 5. The body 12a of a motor 12 for rotating the second spindle 6 is fixed to the motor retention member 4. The second spindle 6 is fixed to an output shaft 12b of the motor 12, while being electrically insulated from it, by an insulating coupling 13. The motor 12 has a rotary encoder 12c for detecting the angular position of the output shaft 12b. The rotary encoders 10 and 12c each send position feedback signals to a control section 23. The control section 23 controls the motor 12 so that the second spindle 6 can rotate in synchronism with the first spindle 5. An energizing ring 14 is fitted to an outer periphery of the second spindle 6. A plurality of brushes 15 are provided as first connecting means for electrically connecting the base side and the second spindle 6. The brushes 15 are connected to electrical power supply lines or signal lines provided at the base side. The brushes 15 are held by a brush retention member 24 made from an insulating material, and the brush retention member 24 is provided on the motor retention member 4. The brushes 15 are pressed by a spring 16 in a radial direction of the second spindle 6 against the energizing ring 14. The pressing force of the brushes 15 on the energizing ring 14 is set sufficiently large to establish a reliable electrical connection between the two. Since the pressing force of the brushes 15 is sufficiently large, the axial vibration of the second spindle 6 will become large. In this embodiment, a plurality of brushes 15 are provided. It is also possible to provide only a single brush 15. Instead of using the brushes 15 as the first connecting means, it is also possible to use an arbitrary connecting means for reliably electrically connecting the base side and the second spindle 6.

Figure 2:
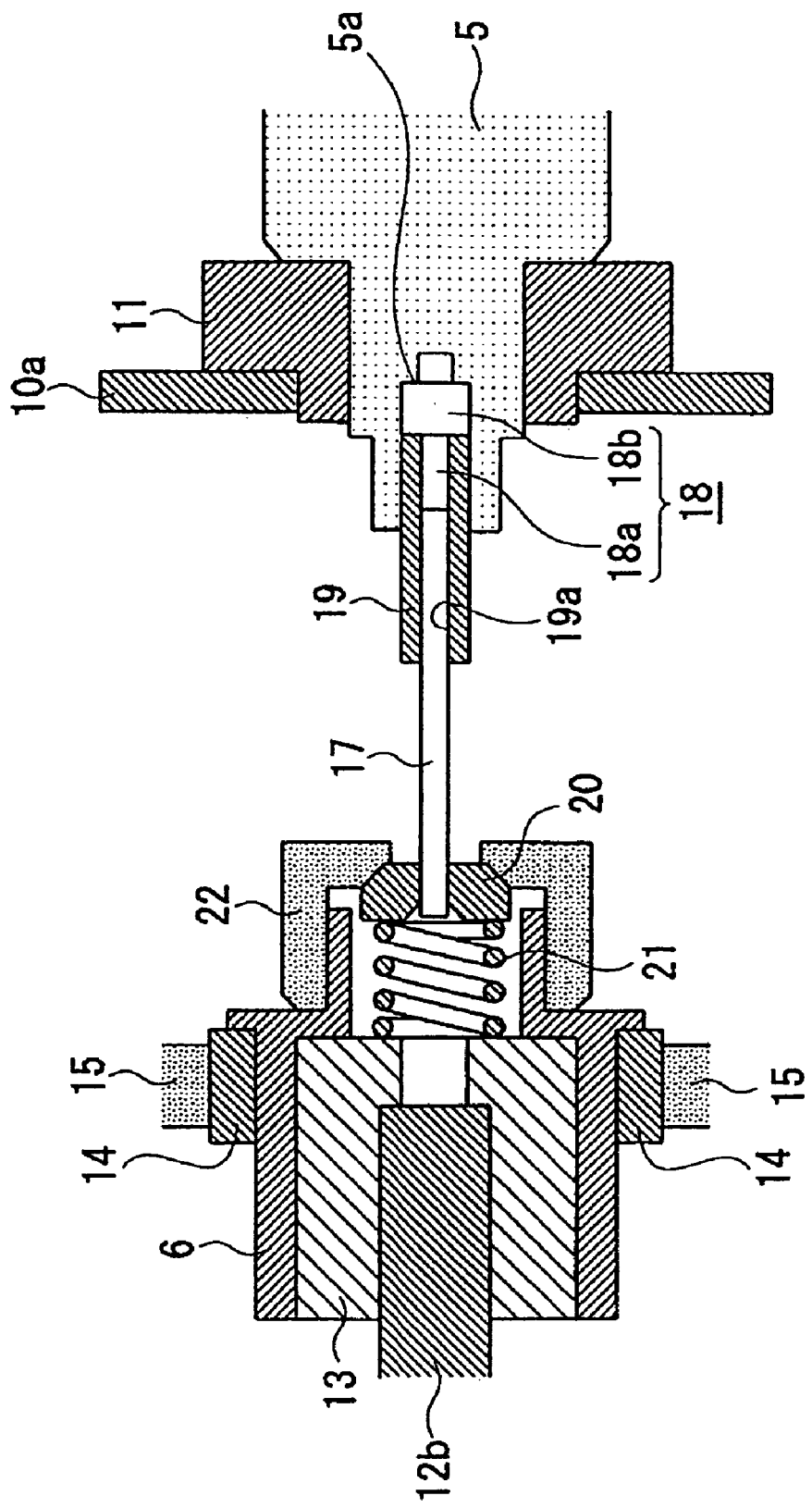
FIG. 2 is an enlarged cross-sectional view showing the second connection means in FIG. 1.

As is shown clearly in FIG. 2, a flexible electrical wire 17 is provided as second connecting means for connecting the first spindle 5 and the second spindle 6. The electrical wire 17 has a degree of mechanical freedom, which means that compared to the case where the connection between the spindles 5 and 6 uses a rigid body, a force that would be transmitted from the second spindle 6 to the first spindle 5 causing axial vibration in the first spindle 5 is reduced. The electrical wire 17 is made from a twisted wire such as copper, for example. In order to significantly improve the rotational accuracy of the first spindle 5, it is preferable to ensure that any increase in force on the first spindle 5 due to the electrical wire 17 is as low as possible. It is therefore preferable for the electrical wire 17 to be as soft as possible. The electrical wire 17 is fixed to the first spindle 5 using a fixing member 18 and a bolt 19. A screw hole having a stepped section 5a is formed in the rear end of the spindle 5. The fixing member 18 is made of a conductive material and consists of a small diameter section 18a and a large diameter section 18b. The small diameter section 18a is fastened to one end of the electrical wire 17, and the large diameter section 18b is brought into contact with the stepped section 5a. The conductive bolt 19 having a central hole 19a is screwed into the screw hole of the first spindle 5. The electrical wire 17 and the small diameter section 18a are inserted into the central hole 19a. The bolt 19 presses the large diameter section 18b into the first spindle 5, and the electrical wire 17 is electrically connected to the first spindle 5 by means of the fixing member 18 and the bolt 19. A conductive piece 20 formed from a conductive material is fastened to the other end of the electrical wire 17. A cup 22 formed from a conductive material is screwed into the second spindle 6. The conductive piece 20 is pressed into the cup 22 by a pressure spring 21. In this manner, the electrical wire 17 is fixed to the second spindle 6, and is electrically connected to the second spindle 6 by the conductive piece 20 and the cup 22. The electrical wire 17 extends in alignment with the axes of the spindles 5 and 6, but can also be curved. It is also possible for each of the end sections of the electrical wire 17 to be fixed to the spindles 5 and 6 using solder attachment.

A second embodiment of a spindle apparatus will now be described with reference to FIG. 3.

Figure 3:
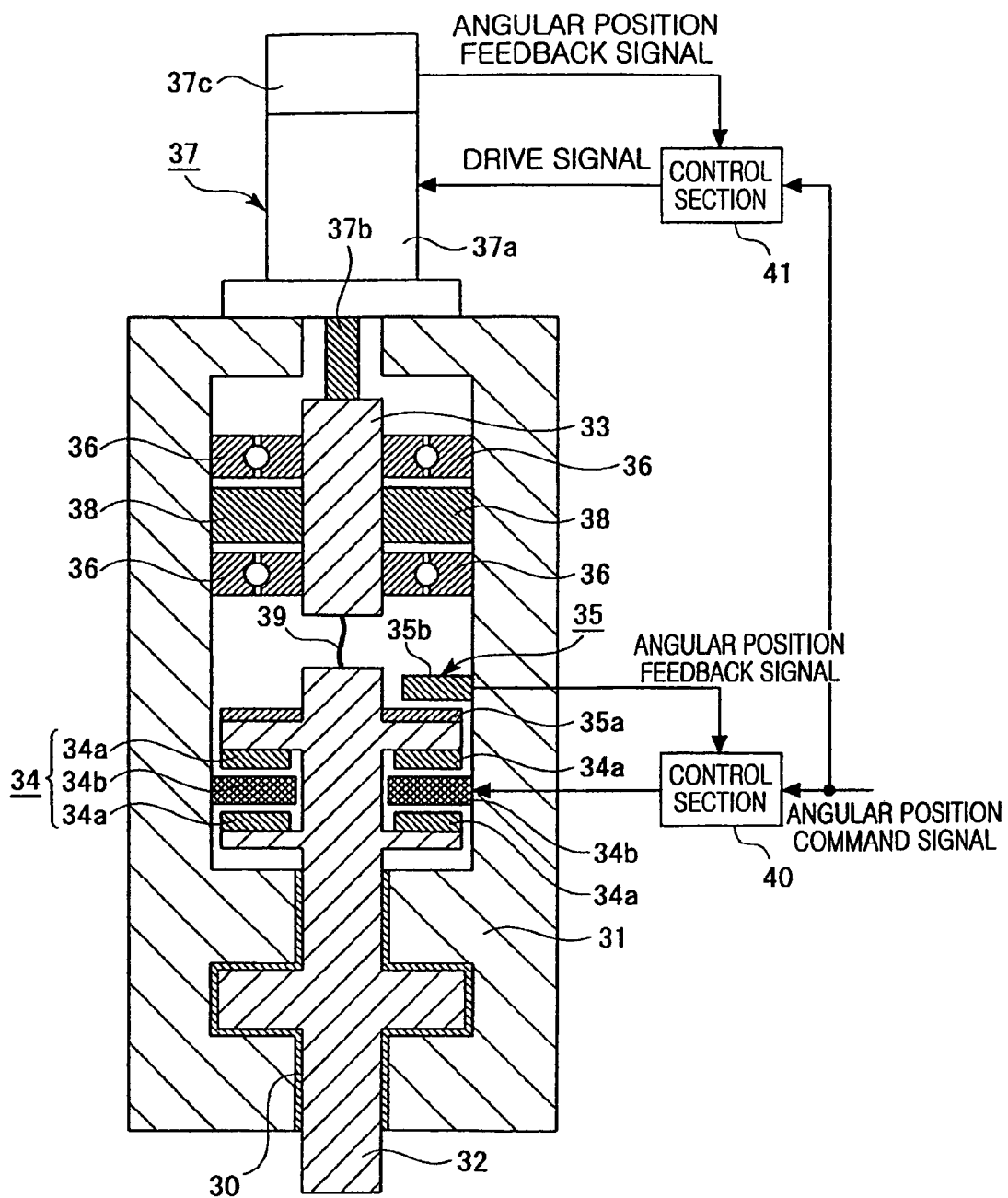
FIG. 3 is a cross-sectional drawing showing a second embodiment of a spindle apparatus of the present invention.

The spindle apparatus shown in FIG. 3 is provided with a housing 31 forming a base, and first and second spindles 32, 33 housed in the housing 31. The first and second spindles 32, 33 are formed from a conductive material. The first spindle 32 is supported by an air hydrostatic bearing 30 built into the housing 31, thereby enabling rotation with extremely high accuracy about an axis extending in the vertical direction in FIG. 3. A desired tool can be attached to the lower end of the first spindle 32 using a tool holder (not shown). The first spindle 32 is rotated by a coreless motor 34. The coreless motor 34 is formed from a permanent magnet section 34a, constituting a rotor, and a coil section 34b constituting a stator. The permanent magnet section 34a is fixed to the first spindle 32 and the coil section 34b is fixed to the housing 31. A rotary encoder 35 consisting of a rotation plate 35a and a detection head 35b is provided in order to detect the angular position of the first spindle 32. The rotation plate 35a is fixed to the first spindle 32. The detection head 35b is fixed to the housing 31 so as to face the rotation plate 35a.

A second spindle 33 is supported within the housing 31 and is capable of rotation about an axis that is in alignment with the first spindle 32. The second spindle 33 is supported by a mechanical bearing 36, and is rotated by a motor 37, such as a servo motor. A body 37a of the motor 37 is fixed to the housing 31. An output shaft 37b of the motor 37 is linked to an upper end of the second spindle 33. The motor 37 has a rotary encoder 37c for detecting the angular position of the output shaft 37b. The rotary encoders 35 and 37c each send position feedback signals to respective control sections 40 and 41. The control sections 40 and 41 respectively control the motors 34 and 37 based on the position feedback signals and position command signals. Since the same position command signal is supplied to the control sections 40 and 41, the second spindle 33 is rotated in synchronism with the first spindle 32. A brush 38 is provided as first connecting means for electrically connecting the base side and the second spindle 33. The brush 38 is connected to electrical wires required for electrical power supply or communication. The brush 38 is pressed in a radial direction of the second spindle 33 and brought into press contact with the second spindle 33. The pressing force of the brush 38 on the second spindle 33 is set sufficiently large to establish a reliable electrical connection between the two. A flexible electrical wire 39 is provided as second connecting means for electrically connecting the first spindle 32 and the second spindle 33. The electrical wire 39 is equivalent to the electrical wire 17 in FIG. 1, and therefore a detailed description thereof has been omitted.

A third embodiment of a spindle apparatus will now be described with reference to FIG. 4. The same reference numerals as are used in FIG. 3 denote the same elements in FIG. 4, and detailed description of those elements is omitted.

Differing from the second embodiment, the third embodiment does not use flexible electrical wire 39. Instead, a helical spring 51 is provided as second connecting means for electrically connecting the first spindle 32 and the second spindle 33. The helical spring 51 is arranged so that its axis is in alignment with the axes of the spindles 32 and 33. The helical spring 51 can be fixed to the spindles 32 and 33 using the same methods as used for the electrical wire 17. The helical spring 51 has a degree of mechanical freedom, which means that compared to the case where the connection between the spindles 32 and 33 is performed using a rigid body, a force that would be transmitted from the second spindle 33 to the first spindle 32 to cause axial vibration in the first spindle 32 is reduced. The helical spring 51 can also be used in the first embodiment in place of the electrical wire 17.

A fourth embodiment of a spindle apparatus will now be described with reference to FIG. 5. The same reference numerals as are used in FIG. 3 and FIG. 4 denote the same elements in FIG. 5, and detailed description of those elements is omitted.

Figure 4:
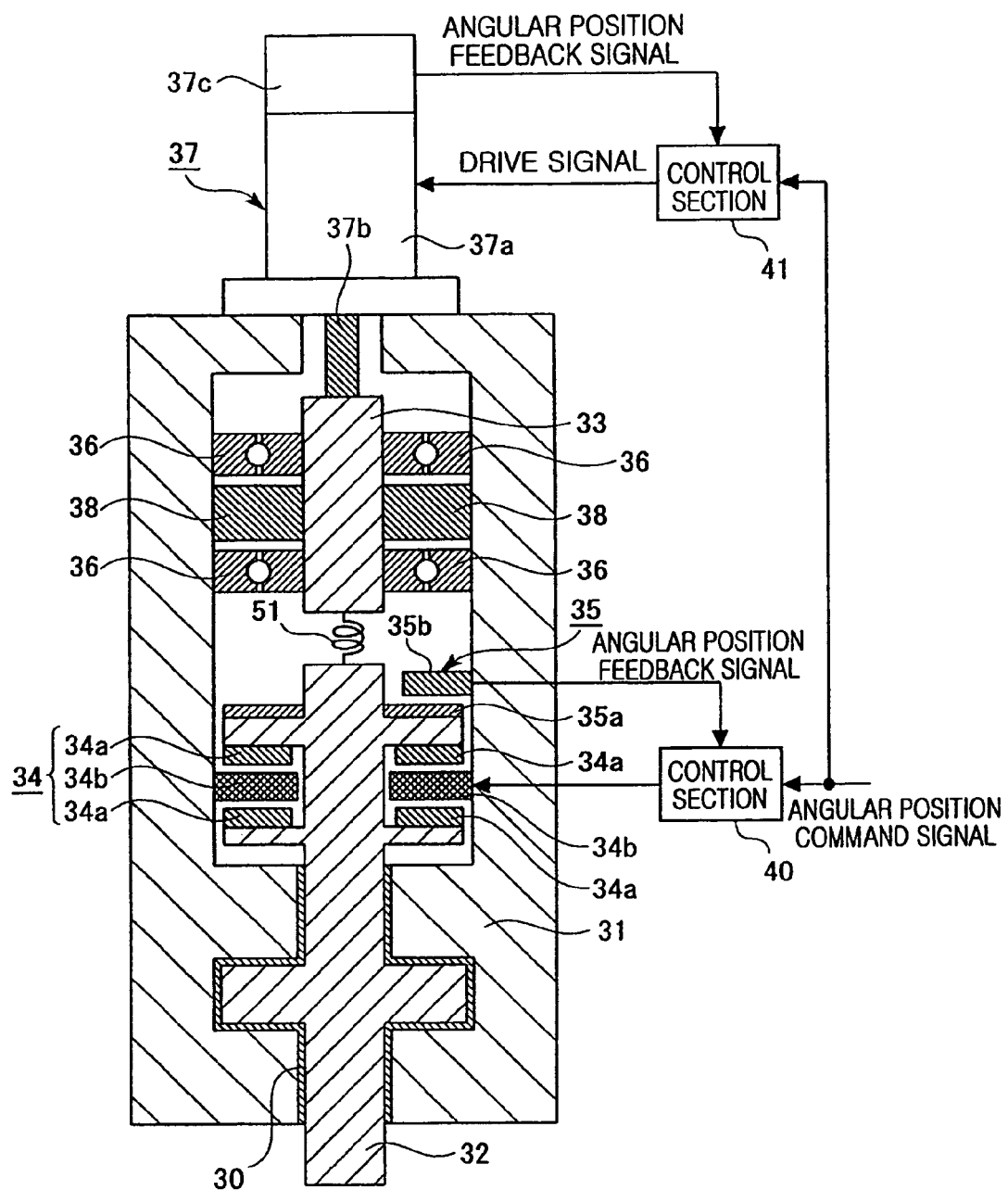
FIG. 4 is a cross-sectional drawing showing a third embodiment of a spindle apparatus of the present invention.
Figure 5:
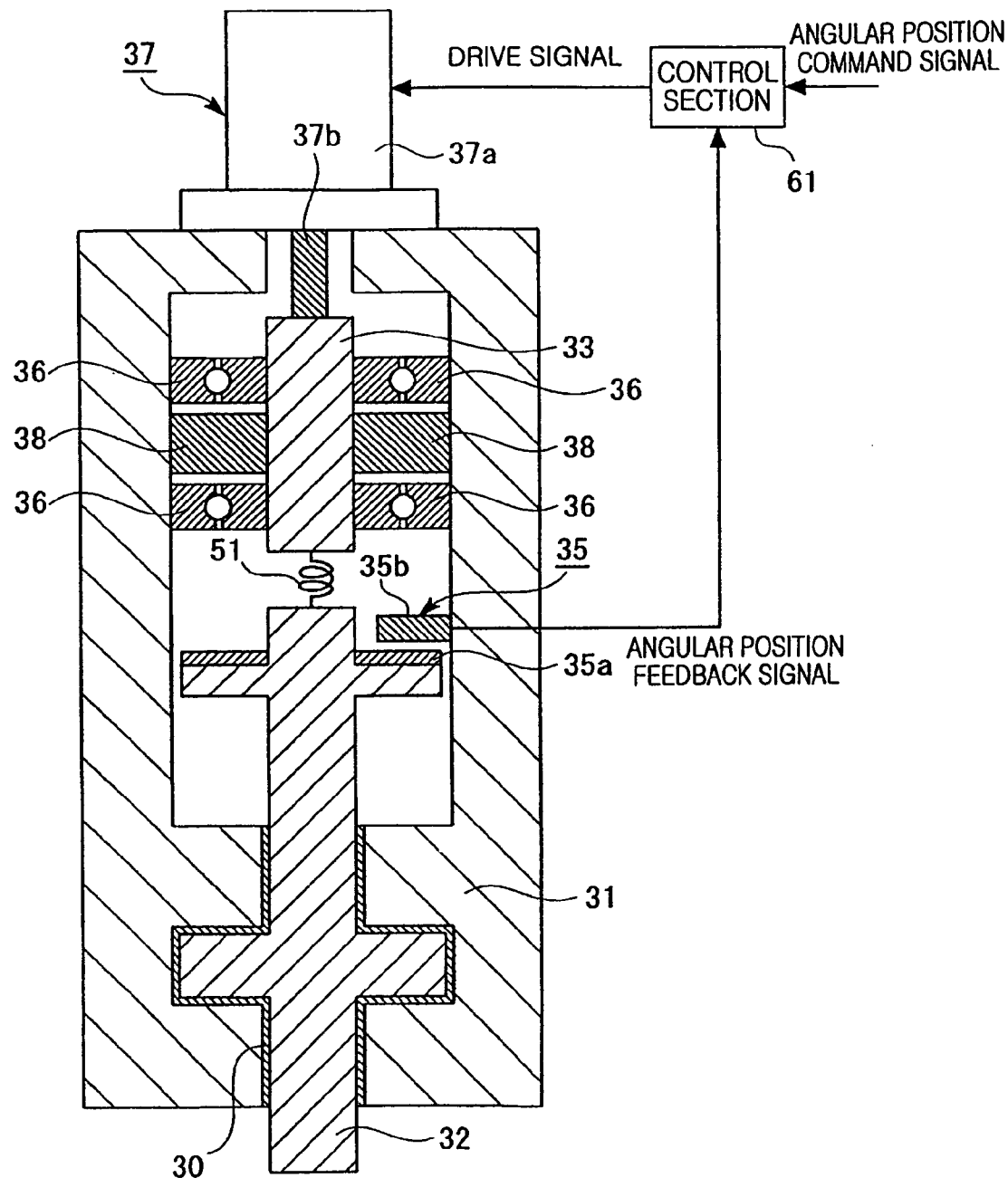
FIG. 5 is a cross-sectional drawing showing a fourth embodiment of a spindle apparatus of the present invention.

The motor 34 for rotating the first spindle 32 of FIG. 4 is eliminated from the spindle apparatus of FIG. 5. The first spindle 32 of FIG. 5 is rotated by rotational torque transmitted from the second spindle 33 via the helical spring 51. A spring constant of the helical spring 51 is determined taking into consideration transmission of rotational torque. The rotary encoder 35 transmits position feedback signals to the control section 61, and the control section 61 controls the motor 37 based on the position feedback signals and position command signals. The motor 37 does not have a rotary encoder. The spindle apparatus of FIG. 5 is advantageous compared to the other embodiments from the viewpoint of reduced cost.

The embodiments have been chosen in order to explain the principles of the invention and its practical applications, and many modifications are possible in light of the above teachings. It is intended that the scope of the invention be defined by the claims appended hereto.

The invention claimed is:

1. A spindle apparatus comprising:
   a first spindle supported in a base by an air hydrostatic bearing and configured to rotate by injecting air with respect to the base;
   a second spindle configured to rotate about an axis substantially aligned with an axis of the first spindle;
   a motor for rotating the second spindle;
   first connection means for electrically connecting a base side and the second spindle; and
   second connection means having a degree of mechanical freedom for connecting the first spindle and the second spindle, wherein the second connection means includes a flexible electrical wire,
   wherein electrical connection between the base side and the first spindle is carried out by means of the first and second connection means.

2. The spindle apparatus according to claim 1, wherein the first connection means comprises a brush pressed against the second spindle.

3. The spindle apparatus according to claim 1, wherein the first spindle is configured to be attached to a tool.

4. The spindle apparatus according to claim 1, wherein the second spindle is configured to rotate in synchronism with the first spindle.

5. A spindle apparatus comprising:
   a first spindle supported in a base by an air hydrostatic bearing and configured to rotate by injecting air with respect to the base;
   a second spindle configured to rotate about an axis substantially aligned with an axis of the first spindle;
   a motor for rotating the second spindle;
   first connection means for electrically connecting a base side and the second spindle; and
   second connection means having a degree of mechanical freedom for connecting the first spindle and the second spindle,
   , wherein the second connection means is configured to transmit less force than would be transmitted from the second spindle to the first spindle to cause axial vibration in the first spindle than a rigid body, and
   wherein electrical connection between the base side and the first spindle is carried out by means of the first and second connection means.

6. The spindle apparatus according to claim 5, wherein the first connection means comprises a brush pressed against the second spindle.

7. The spindle apparatus according to claim 5, wherein the first spindle is configured to be attached to a tool.

8. The spindle apparatus according to claim 5, wherein the second spindle is configured to rotate in synchronism with the first spindle.

* * * * *